2 Sheets—Sheet 1.
W. RYNER.
Steam Drying Apparatus.
No. 2,978.
Reissued June 9, 1868.
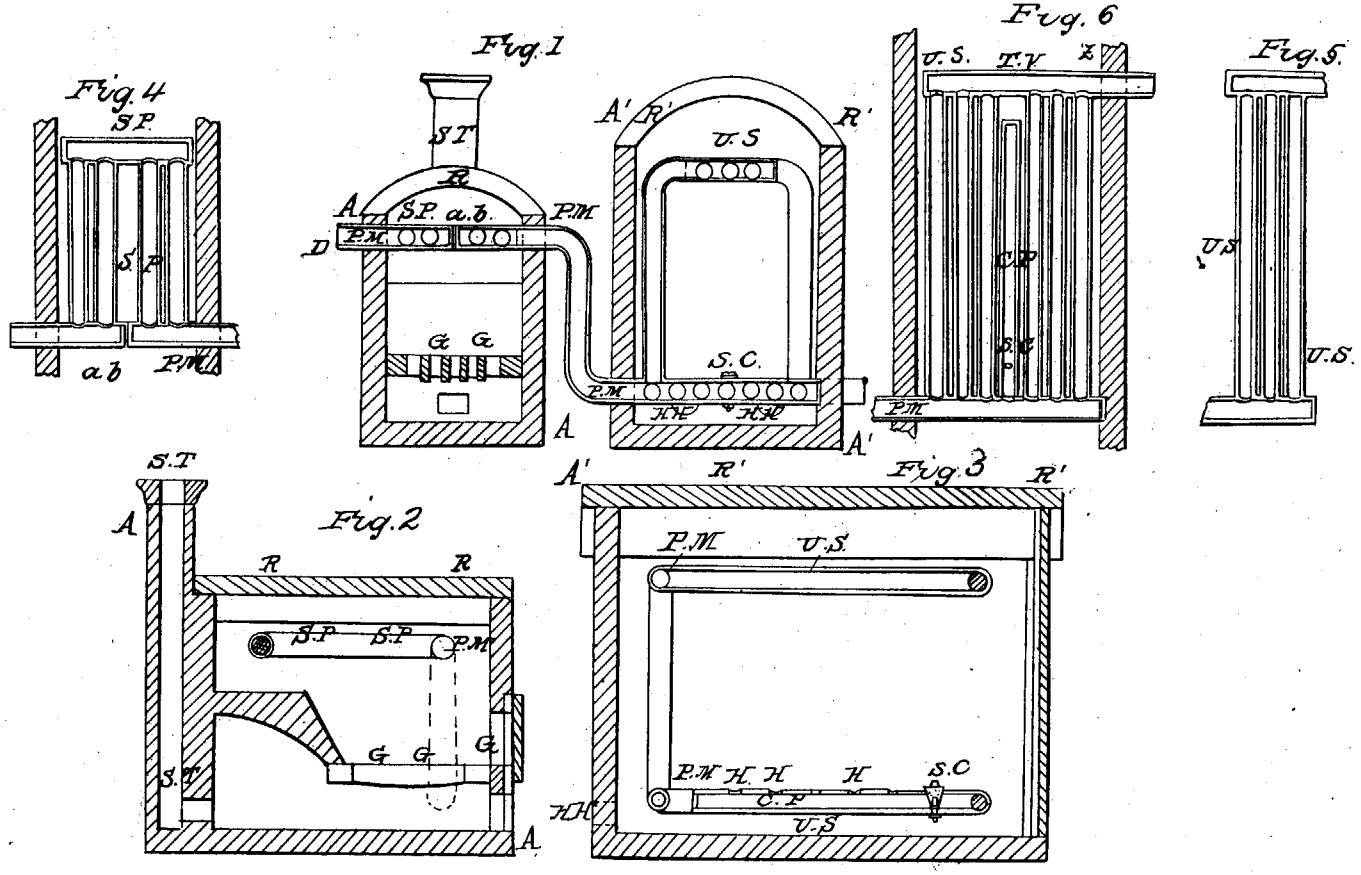
Witnesses
Samuel L. Taylor
William N. Roberts
Inventor
William Ryner
by L. Edmund Crane
attorney
N. PETERS, Photo-Lithographer, Washington, D. C.

2 Sheets—Sheet 2.
W. RYNER.
Steam Drying Apparatus.
No. 2,978.
Reissued June 9, 1868.
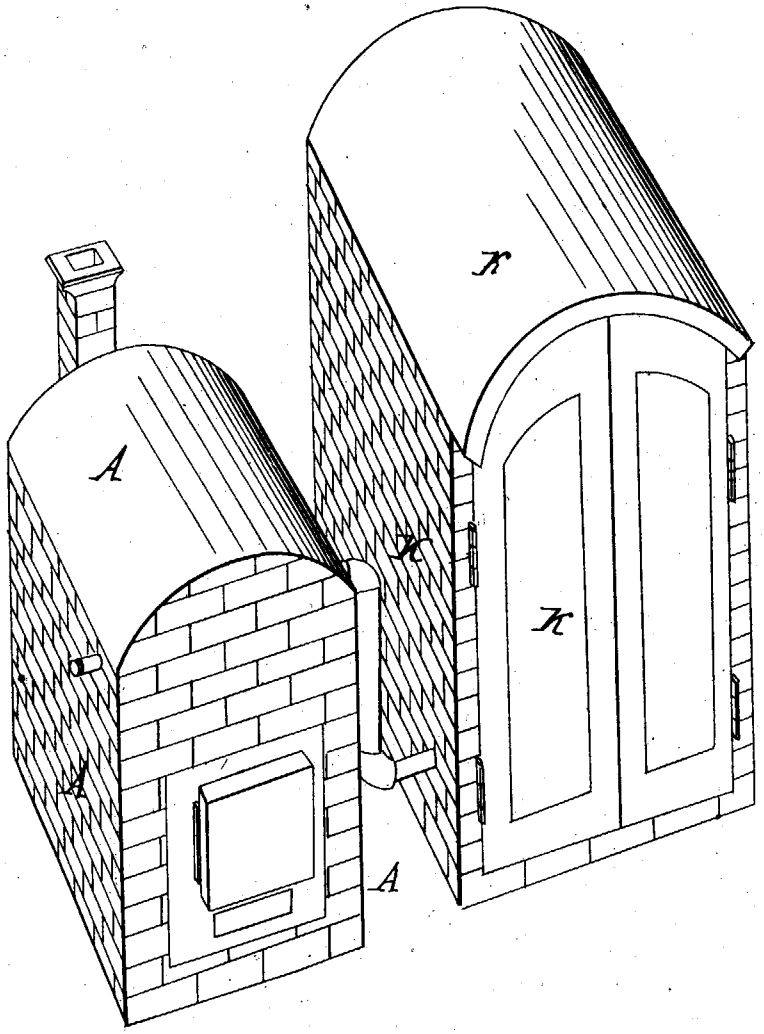
Witnesses
Samuel L. Taylor
William W. Roberts
Inventor
William Ryner
per d'Epineuil & Grant
attorneys
N. PETERS, Photo-Lithographer, Washington, D. C.

UNITED STATES PATENT OFFICE.

WILLIAM RYNER, OF PHILADELPHIA, PA., AND JOHN C. HOPEWELL, OF FLEMINGTON, N. J., ASSIGNEES OF SAID WILLIAM RYNER.

IMPROVEMENT IN STEAM DRYING APPARATUS.

Specification forming part of Letters Patent No. 68,239, dated August 27, 1867; Reissue No. 2,978, dated June 9, 1868.

*To all whom it may concern:*

Be it known that we, WILLIAM RYNER, of Philadelphia, Pennsylvania, and JOHN C. HOPEWELL, of Flemington, New Jersey, are the owners of certain Letters Patent for an Improvement in Kiln-Drying Apparatus, granted to us August 27, 1867; and we do hereby declare the following to be a full, clear, and exact description of the said invention.

The invention of the said RYNER consists of a kiln in which are an upper and lower series of pipes for the passage of superheated steam and the introduction of the same into the kiln, the said pipes being so arranged that the lumber or other material to be dried may be subjected to the combined action of the heat from the pipes and that of the superheated steam, all as described hereinafter.

We will now proceed to describe the manner in which the said invention may be carried into effect, reference being had to the accompanying drawings, which form a part of this specification, and in which—

Figure 1, Plate 1, is a perspective view of the apparatus; Fig. 1, Plate 2, a transverse section of the same; Fig. 2, Plate 2, a transverse section of the furnace, chimney, &c.; Fig. 3, Plate 2, a longitudinal sectional elevation of the kiln and pipes; Fig. 4, Plate 2, a plan view of the steam-pipes in the fire-place; Fig. 5, Plate 2, a plan view of the upper steam-pipes in the kiln; Fig. 6, Plate 2, a plan view of the lower steam-pipes in the kiln.

Two oblong buildings, A and K, Drawing No. 1, the former being the furnace and the latter the kiln, are built adjacent to each other, of brick or other suitable material, and have in the present instance arched roofs of metal. The interior of the furnace is provided with a suitable grate, G, above which are the fuel and fire chamber, and below the ash-pit, S T being the chimney for carrying off the products of combustion. (See Fig. 2, Plate 2.)

Within the fire-place of the furnace, beneath the metal roof of the same, is a system of pipes, S P, arranged as shown in Figs. 1, 2, and 4, Plate 2, one end, D, of this system of pipes projecting through one wall of the furnace, the other end, P M, passing through the other wall.

The kiln K is provided at one end with doors, as shown in Fig. 1, and has in the inside an upper system of pipes, V S, near the roof, and a lower system, V′ S′, near the floor, a plan view of the former being shown in Fig. 5 and of the latter in Fig. 6, while both are shown in sectional elevation in Figs. 1 and 3.

One or more of the lower series of pipes are perforated. In the present instance the center pipe only is thus perforated, and this pipe furnished with a suitable cock, S C.

The lumber or other material to be dried is placed in the kiln, between the upper and lower series of pipes, the door is closed, and after the fuel in the furnace has been thoroughly ignited steam is admitted to the pipes S P, from which it passes in a highly superheated state through the pipe P M to the upper and lower system of pipes, and finally escapes into the kiln through such of the pipes as are perforated, providing the cock S C be open. The superheated steam thus introduced into the kiln will, after acting on the lumber, pass off through openings H H at the rear of the kiln. More or less of the steam may be allowed to escape from the pipes (without passing into the kiln) through the branch Z, which may be provided with a suitable valve or cock, and the quantity of superheated steam admitted to the kiln may be regulated at pleasure by the cock S C.

The efficiency of superheated steam for kiln-drying purposes is well known. It has been found, however, by many practical tests, that its efficiency is increased when applied simultaneously with radial heat imparted by a suitable system of heating-pipes.

The arrangement of pipes may be modified without departing from the main features of the invention.

Disclaiming the use of superheated steam for kiln-drying purposes, we claim as the invention of the said WILLIAM RYNER—

A drying-kiln in which are an upper and lower series of pipes for the passage of superheated steam to and the introduction of the same into the kiln, so that the material to be dried (situated between the two sets of pipes) may be subjected to the combined action of the heat from the said pipes and that of the superheated steam, as set forth.

In testimony whereof we have signed our names to this specification before two subscribing witnesses.

WM. RYNER.
JOHN C. HOPEWELL.

Witnesses:
JOHN WHITE,
C. B. PRICE.